United States Patent
Grisenthwaite et al.

(10) Patent No.: US 9,804,851 B2
(45) Date of Patent: Oct. 31, 2017

(54) OPERAND SIZE CONTROL

(75) Inventors: Richard Roy Grisenthwaite, Nr Royston (GB); David James Seal, Cherry Hinton (GB); Philippe Jean-Pierre Raphalen, Valbonne (FR); Lee Douglas Smith, Cambridge (GB)

(73) Assignee: ARM LIMITED, Cambridge (GB)

( * ) Notice: Subject to any disclaimer, the term of this patent is extended or adjusted under 35 U.S.C. 154(b) by 1775 days.

(21) Appl. No.: 13/064,257

(22) Filed: Mar. 14, 2011

(65) Prior Publication Data

US 2011/0231633 A1    Sep. 22, 2011

(30) Foreign Application Priority Data

Mar. 15, 2010 (GB) .................................. 1004300.8

(51) Int. Cl.
  *G06F 15/00* (2006.01)
  *G06F 9/40* (2006.01)
  *G06F 9/30* (2006.01)
  *G06F 9/38* (2006.01)
  (Continued)

(52) U.S. Cl.
  CPC .......... *G06F 9/3016* (2013.01); *G06F 9/3001* (2013.01); *G06F 9/30112* (2013.01); *G06F 9/3861* (2013.01); *G06F 21/577* (2013.01); *G06F 21/70* (2013.01); *G06F 2221/2145* (2013.01)

(58) Field of Classification Search
  None
  See application file for complete search history.

(56) References Cited

U.S. PATENT DOCUMENTS 4,109,310 A * 8/1978 England et al. ............... 712/243
4,825,355 A * 4/1989 Kurakazu et al. ............ 712/224
5,148,544 A * 9/1992 Cutler et al. .................. 710/261
(Continued)

FOREIGN PATENT DOCUMENTS

DE    198 26 826    7/1999
GB    2 424 731    10/2006

OTHER PUBLICATIONS

Patterson et al. (Overcoming the Limitations of Conventional Vector Processors, May 2003, pp. 399-409).*
(Continued)

*Primary Examiner* — George Giroux
(74) *Attorney, Agent, or Firm* — NIXON & VANDERHYE PC (57) ABSTRACT

A data processing system is provided with processing circuitry as well as a bank of 64-bit registers. An instruction decoder decodes arithmetic instructions and logical instruction specifying arithmetic operations and logical operations to be performed upon operands stored within the 64-bit registers. The instruction decoder is responsive to an operand size field SF within the arithmetic instructions and the logical instructions specifying whether the operands are 64-bit operands or 32-bit operands where all of the operands are 64-bit operands or all of the operands are 32-bit operands. If a switch is made to a lower exception level, then a check is made as to whether or not a register being used was previously subject to a 64-bit write to that register. If such a 64-bit write had previously taken place, then the upper 32-bits are flushed so as to avoid data leakage from the higher exception level.

23 Claims, 5 Drawing Sheets

(51) Int. Cl.
    *G06F 21/57*     (2013.01)
    *G06F 21/70*     (2013.01)

(56) References Cited

U.S. PATENT DOCUMENTS

| | | | |
|---|---|---|---|
| 5,961,575 A * | 10/1999 | Hervin et al. | 708/209 |
| 6,237,076 B1 | 5/2001 | Gaertner et al. | |
| 6,499,046 B1 * | 12/2002 | Nguyen et al. | 708/552 |
| 6,802,017 B1 | 10/2004 | Takayama et al. | |
| 6,807,622 B1 | 10/2004 | McGrath | |
| 7,047,396 B1 | 5/2006 | Fotland et al. | |
| 2004/0186981 A1 | 9/2004 | Christie et al. | |
| 2006/0087992 A1 * | 4/2006 | Ganesh | G01D 21/00 370/310 |

OTHER PUBLICATIONS

Iftode et al. (Scylla: A Smart Virtual Machine for Mobile Embedded Systems, Dec. 2000, pp. 41-50).*
Search Report for GB 1004300.8 dated Jul. 14, 2010.
International Search Report and the Written Opinion of the International Searching Authority mailed Apr. 18, 2011 in PCT/GB2011/050397.
Kozyrakis, C., et al., "Overcoming the Limitations of Conventional Vector Processors," Symposium on Computer Architecture (ISCA), Jun. 2003 (11 pages).
Office Action issued in Taiwanese Application No. 100107186 dated Mar. 25, 2015 (27 pages).
English Translation of Office Action issued in Taiwanese Application No. 100107186 dated Mar. 25, 2015 (12 pages).
Search Report issued in Taiwanese Application No. 100107186 dated Mar. 19, 2015 (1 page).

* cited by examiner

OPERAND SIZE CONTROL

This application claims priority to GB Application No. 1004300.8 filed 15 Mar. 2010, the entire contents of which are incorporated herein by reference.

BACKGROUND OF THE INVENTION

Field of the Invention

This invention relates to the field of data processing systems. More particularly, this invention relates to data processing systems for performing data processing operations specified by arithmetic instructions and logical instructions.

Description of the Prior Art

It is known to provide data processing systems including processing circuitry controlled by an instruction decoder which decodes a stream of program instructions. The processing circuitry can perform data processing operations upon data values held within registers of a register bank. The data processing operations performed can include arithmetic operations (such as addition, subtraction, multiplication, etc) and logical operations (such as AND, OR, XOR, etc). It is known that data values to be manipulated by arithmetic and logical instructions can have different bit lengths. For example, integer values to be manipulated may be 32-bit integers or 64-bit integers. If 32-bit integer values are subject to a logical or arithmetic operation, then at least the least significant portion of the result will have the same value as if those 32-bit input operands had been treated as 64-bit input operands and manipulated with a 64-bit instruction. For this reason, known instruction sets do not expend instruction encoding bit space within the instructions in providing a way of distinguishing between 32-bit and 64-bit logical and arithmetic instructions.

SUMMARY OF THE INVENTION

Viewed from one aspect the present invention provides apparatus for processing data comprising:

a plurality of 2N-bit registers;

processing circuitry configured to perform data processing operations; and instruction decoder circuitry coupled to said processing circuitry and responsive to a stream of program instructions of a fixed size of an instruction set to generate control signals for controlling said processing circuitry to perform said data processing operations; wherein said instruction decoder is configured to decode arithmetic instructions and logical instructions of said instruction set respectively specifying arithmetic operations and logical operations to be performed upon operands stored within said plurality of 2N-bit registers; and said instruction decoder circuitry is configured to decode an operand size field within said arithmetic instructions and said logical instructions specifying one of:

(i) said operands are 2N-bit operands each stored within a separate 2N-bit register of said plurality of 2N-bit registers; and (ii) said operands are N-bit operands each stored within a separate 2N-bit register of said plurality of 2N-bit registers.

The present technique recognises that explicitly indicating whether an arithmetic instruction or a logical instruction has either an N-bit operand size or a 2N-bit operand size can be used when controlling the processing apparatus even though the information is not required to provide the correct result. Thus, contrary to the prejudice in the field, the bit space used by the operand size field is justified.

Whilst it is possible that the operand size field may only be provided within a subset of the arithmetic instructions and the logical instructions, in some embodiments all of the arithmetic instructions and all of the logical instructions include the operand size field.

The operand size field may also be used to specify the bit width of the processing operation to be performed, e.g. the whole width of an adder circuit need not be clocked if only the least significant portion of the adder circuit corresponds to the operands to be manipulated.

When the operand size field indicates an N-bit processing operation, then in some embodiments a most significant N bits within the 2N-bit register storing the N-bit result operand may be all set to zero or all have a signed extending value taken from the most significant bit of the N-bit result operand. In other embodiments the most significant N bits within the 2N-bit register storing the N-bit result operand may be left unchanged by the N-bit processing operation.

It will be appreciated that the plurality of registers used by the processing operations may be subject to register remapping. Register remapping is a known technique for facilitating out-of-order processing and other high performance techniques. In register remapping systems, register renaming circuitry provides a mapping between architectural registers specified within the program instructions and the 2N-bit registers which are physically provided.

The apparatus may operate with a plurality of exception levels arranged in an exception level hierarchy. These exception levels can be considered as hardware privilege levels. When a switch is made to an exception level with a lower level of privilege, it is important for security that data being manipulated by the system when operating at the higher level of privilege is not made inappropriately accessible when operating at the lower level of privilege, e.g. an encryption key from a secure privilege level is not even partially accessible when a switch is made to a non-secure (lower) privilege level. When operating in a system supporting register remapping and which also supports such multiple exception levels, there is the possibility of information leakage when switching from decoding of instructions of the instruction set at one level of privilege to decoding instructions at a lower level of privilege. More particularly, unallocated registers within the physical registers used by the register renaming circuit may store residual 2N-bit values left over from when they were last used as an architectural register and these physical registers may subsequently be mapped for use by instructions executed at the lower privilege level. If these unallocated registers carrying over 2N-bit data values are reused at the lower privilege level and are mapped to architectural registers, then it is possible that at least a portion of the residual data value from the previous higher privilege level may be accessed from the lower privilege level as a write to a previously unallocated 2N-bit register may be an N-bit write that leaves the most significant N bits of the register unaltered and readable now the register is allocated. This represents a security vulnerability if, for example, the residual value was a portion of a secure item of data, such as an encryption key.

In order to address this problem the apparatus can be configured such that when a switch is made from a first exception level of said plurality of exception levels to a second exception level of said plurality of execution levels, with said second exception level being lower in said exception level hierarchy than said first exception level, all unallocated registers are flushed so as to store predetermined values. While this is a secure approach, it suffers from the disadvantage of potentially slowing the switch between exception/privilege levels, as well as wasting energy.

Another approach to addressing this security vulnerability is to associate a dirty flag corresponding to each of the 2N-bit registers which is set for each unallocated register when a switch is made from a first exception level of said plurality of exceptions to a second exception level of said plurality of exceptions with said second exception level being lower in said exception level hierarchy than said first exception level. A write made to an unallocated 2N-bit register for which the dirty flag is set (i.e. may be storing a residual 2N-bit value), triggers those bit positions not overwritten by a N-bit value being written into that register to be set to predetermined values.

The dirty flag may also be used upon occurrence of a switch from a higher to a lower exception level such that any register having a dirty flag set and that is unallocated will be flushed when the switch of exception level is made.

Viewed from a further aspect the present invention provides an apparatus for processing data comprising:

a plurality of 2N-bit register means for storing data values;

processing means for performing data processing operations; and instruction decoding means coupled to said processing means for generating control signals for controlling said processing circuitry to perform said data processing operations in response to a stream of program instructions of a fixed size of an instruction set; wherein said instruction decoding means is configured to decode arithmetic instructions and logical instructions of said instructions set respectively specifying arithmetic operations and logical operations to be performed upon operands stored within said plurality of 2N-bit register means; and said instruction decoding means is configured to decode an operand size field within said arithmetic instructions and said logical instructions specifying one of:

(i) said operands are 2N-bit operands each stored within a separate 2N-bit register means of said plurality of 2N-bit register means; and (ii) said operands are N-bit operands each stored within a separate 2N-bit register means of said plurality of 2N-bit register means.

Viewed from a further aspect the present invention provides a method of processing data comprising the steps of:

storing data values within a plurality of 2N-bit registers;

performing data processing operations using processing circuitry; and decoding a stream of program instructions of a fixed size of an instruction set to generate control signals for controlling said processing circuitry to perform said data processing operations; wherein said decoding decodes arithmetic instructions and logical instructions of said instructions set respectively specifying arithmetic operations and logical operations to be performed upon operands stored within said plurality of 2N-bit registers; and said decoding decodes an operand size field within said arithmetic instructions and said logical instructions specifying one of:

(i) said operands are 2N-bit operands each stored within a separate 2N-bit register of said plurality of 2N-bit registers; and (ii) said operands are N-bit operands each stored within a separate 2N-bit register of said plurality of 2N-bit registers.

The above, and other objects, features and advantages of this invention will be apparent from the following detailed description of illustrative embodiments which is to be read in connection with the accompanying drawings.

DESCRIPTION OF THE EMBODIMENTS

Figure 1:
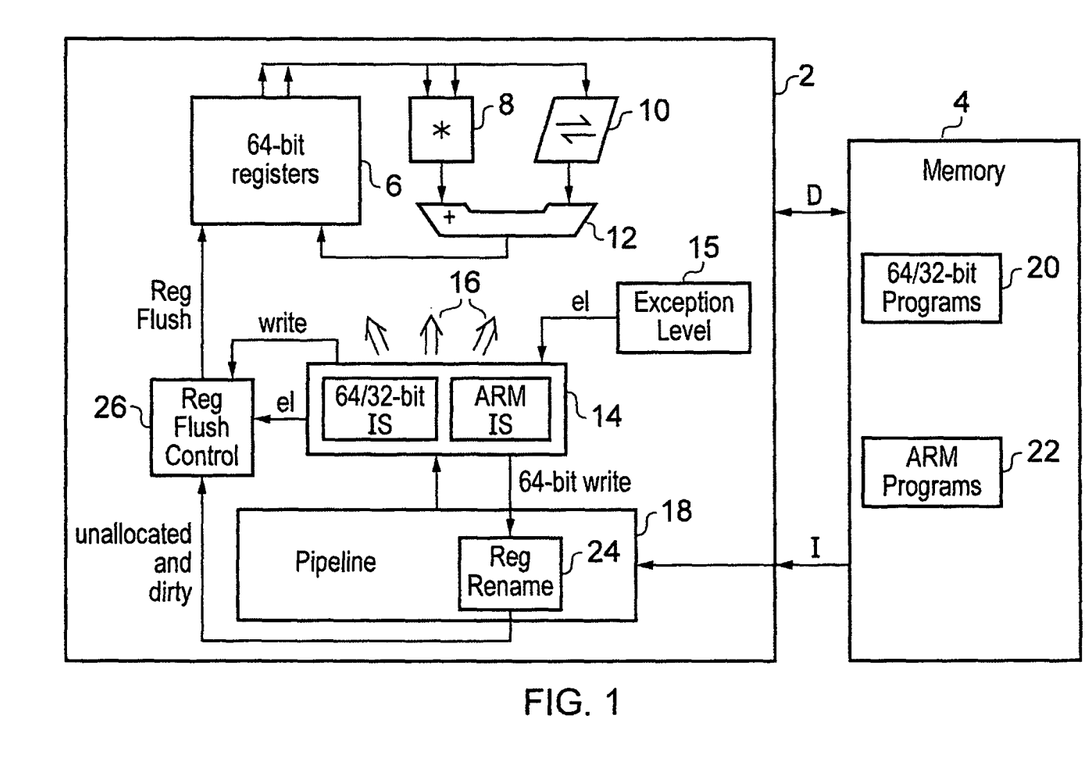
FIG. 1 schematically illustrates a data processing system supporting multiple instruction sets.

FIG. 1 illustrates processor 2 coupled to a memory 4. The processor 2 includes a plurality of 64-bit registers 6 used to hold operand values (both input operands and output operands of data processing instructions). Processing circuitry in the form of a data path including a multiplier 8, a shifter 10 and an adder 12 is used to perform data processing operations, including arithmetic operations and logical operations, upon input operands read from the registers 6 with the result operands being written back to the registers 6. It will be appreciated that in practice many further elements may be provided within the data path and that these have been omitted for the sake of clarity in FIG. 1.

An instruction decoder 14 serves to generate control signals 16 which control the processing circuitry 8, 10, 12 to perform the data processing operations specified by a program instruction being decoded. The program instructions are supplied to an instruction pipeline 18 from the memory 4 and when these instructions reach a decoding state within the pipeline 18 they are decoded by the instruction decoder 14. The instruction decoder 14 serves to decode two different instruction sets although this is not required by the present techniques. In this example embodiment these instruction sets are a 64/32-bit instruction set and an ARM instruction set. The 64/32-bit instruction set performs data processing operations which are either 64-bit data processing operations using 64-bit operands or are 32-bit data processing operations using 32-bit operands. An operand size field within each of the arithmetic instructions and logical instructions of the 64/32-bit instruction set serves to select between these two operand size options. The operand size field may be a single bit, such as an SF bit indicating that 64-bit operand size is selected.

The 64-bit registers 6 each store a single operand value when executing the 64/32-bit instruction set. Thus, when 64-bit operands are selected by the SF bit within an arithmetic instruction or a logical instruction, all 64-bits of the registers specified by the register specifying fields within those instructions are active and are processed in a 64-bit data processing operation specified by the opcode.

In contrast, when the SF bit is not set, the 64-bit registers specified by the register specifying fields within the arithmetic instructions and the logical instructions are treated as holding 32-bit operands in their least significant 32-bit positions with this being subject to a 32-bit data processing operation. The 64-bit registers thus contain an inactive most significant 32-bits when the SF bit is not set for an arithmetic instruction or a logical instruction.

The instruction decoder 14 also supports the decoding of a further instruction set. In this case, this is the ARM instruction set which are 32-bit data processing instructions specifying 32-bit data processing operations performed upon 32-bit input operands and output operands. These 32-bit input operands and output operands are stored within the least significant 32-bits of one of the 64-bit registers 6 when the ARM instruction set is active. The memory 4 stores both 64/32-bit programs 20, and ARM programs 22 for execution. The processor 2 can switch between these two different instruction sets.

The data processing system operates with a plurality of exception levels arranged in an exception level hierarchy. These exception levels may be considered as hardware states defining different levels of privilege in accessing system resources. An example of an exception level hierarchy going from high to low is secure monitor mode, hypervisor mode, system mode and user mode. Exception level circuitry 15 provides an exception level signal e1 to the instruction decoder 14 and elsewhere in the system to control what system resources (e.g. registers, memory locations, etc) can be accessed in the current mode.

As mentioned above, the instruction pipeline 18 includes register renaming circuitry 24 which is responsible for providing a mapping between architectural registers as specified by register specifying fields within the program instructions to be decoded and registers provided as physical registers within the plurality of 64-bit registers 6. Such register renaming operations are known and are useful in supporting high performance features, such as out-of-order execution. When an instruction is decoded its register specifying fields identifying the architectural registers concerned are read and may be mapped (e.g. if the register is being written) to unallocated registers within the physical 64-bit registers 6 which are provided. The register renaming circuitry 24 tracks the dependencies between these registers as they are manipulated and when a physical register is no longer required as holding a value currently active as the value corresponding to the architectural register content at that processing point, then the register can be removed from an allocated group of registers back to an unallocated group of registers so as to be available for further mappings. When a register is returned to the unallocated group, it will continue to store its residual value.

As will be described later, flush control circuitry 26 is provided within the processor 2 and is responsive to data from the register renaming circuitry 24 indicating whether particular registers are unallocated, data from the instruction decoder 14 indicating whether a switch to a lower level of privilege has been made and data from the instruction decoder 14 indicating whether a register write is being made. The register flush control circuitry 26 is responsive to these input signals to flush the top half of the contents (most significant 32 bits) of an unallocated 64-bit register when it is mapped back into use following a switch to a lower level of privilege if that register is marked as dirty with a 64-bit write (i.e. at some stage during the 64/32-bit instruction set execution a 64-bit value was written to that register). It is also possible that the register flush control circuitry 26 in other embodiments could take the step of flushing all unallocated registers when a switch is to a lower level of privilege or flushing all unallocated registers which are marked as "64-bit dirty" (i.e. has been written with a 64-bit value during execution of the 64/32-bit instruction set) when that same switch is made. However, in the embodiment described below the flushing of an unallocated and 64-bit dirty register subsequent to the switch to a lower level of privilege occurs when a write is made to that unallocated and 64-bit dirty register.

Figure 2:
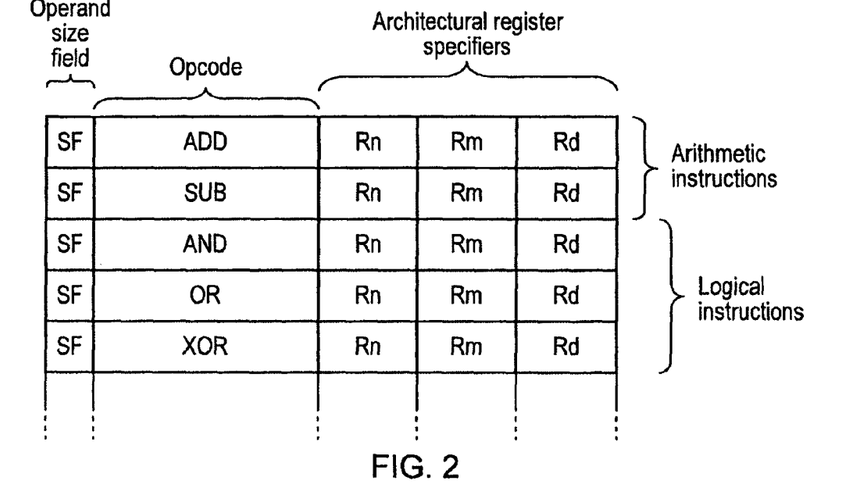
FIG. 2 schematically illustrates arithmetic instructions and logical instructions including an operand size field.

FIG. 2 schematically illustrates arithmetic instructions and logical instructions from the 64/32-bit instruction set. These instructions include architectural register specifying fields specifying typically two input operands within the registers (Rm and Rn) and one result operand to be written into the register specified by the register specifying field (Rd). An opcode portion of the instruction indicates the particular arithmetic or logical operation to be performed. An operand size field in the form of an SF bit indicates whether the instruction is to be performed upon 64-bit operands (SF=1) or 32-bit operands (SF=0). As well as specifying the operand size, the operand size field also controls the width of the data processing operation being performed. Thus, if 32-bit operands are being manipulated, then only a 32-bit wide arithmetic or logical operation need be performed by the data path 8, 10, 12.

It will be appreciated that FIG. 2 illustrates the arithmetic instructions and the logical instructions in a schematic form and in practice the location of the architectural register specifiers, the opcodes and the operand size field need not necessarily be the same in all of these instructions. The instructions may also include further fields. The instruction decoder 14 can decode each instruction on an instruction-by-instruction basis and accordingly deal with such variations if they are desired. Nevertheless, it may be convenient and efficient to provide certain fields in a common place between different instructions, such as the operand size field always being provided by a particular bit position within arithmetic instructions and logic instructions.

The 64/32-bit instruction set will typically include many further types of instructions in addition to the arithmetic instructions and logical instructions. These instructions may include flow-control instructions, such as branch or jump instructions, load instructions and store instructions for moving data values between the memory 4 and the registers 6 as well as other types of instructions. Some of these instructions, such as load instructions and store instructions may also include an operand size field (SF) indicating whether the operands being manipulated are 32-bit operands or 64-bit operands. In all of the arithmetic instructions and the logical instructions each of the 64-bit registers 6 is processed as containing a single operand, whether this be a 64-bit operand or a 32-bit operand.

Figure 3:
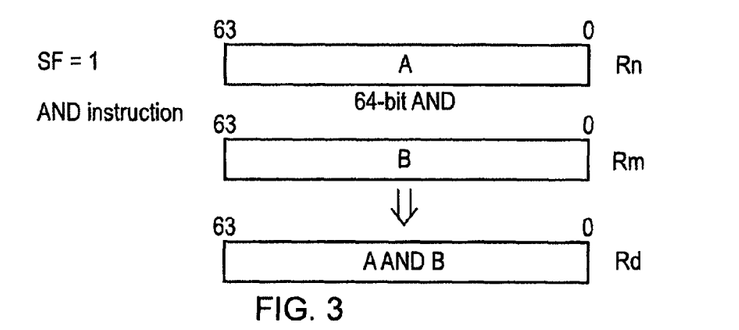
FIG. 3 schematically illustrates a 64-bit logical instruction.

FIG. 3 schematically illustrates a 64-bit AND instruction which is a logical instruction of the 64/32-bit instruction set. In this case the opcode specifies an AND data processing operation and the SF bit is set to a value of "1" indicating that the input operands A and B are both 64-bit values and that the output operand formed from a logical AND of A and B is also a 64-bit value.

Figure 4:
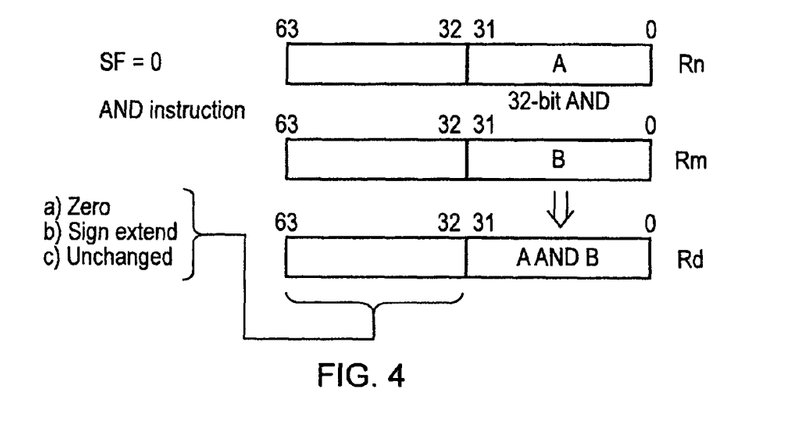
FIG. 4 schematically illustrates a 32-bit logical instruction.

FIG. 4 illustrates a logical AND instruction but in this case the SF bit is set to a value of "0" indicating that the input operands and the result operands are all 32-bit values. The input operands A and B as well as the output operand A AND B are all written into the least significant 32-bits of their respective registers Rn, Rm and Rd.

When the result operand is written into the register Rd, there are different options for how the most significant 32-bits of the register Rd are treated. In some embodiments these 32 bits Rd [63:32] may all be set to 0. In other embodiments, the 32 bits may be set to a bit value which sign extends the result operand written into the least significant 32-bits, i.e. Rd [31] is copied to all of the bit positions within Rd [63:32]. Both of these options provide a degree of determinism in what will be stored within the most significant bits when it is used to manipulate 32-bit operands. However, energy is consumed in either zeroing these bits or sign extending these bits.

In order to reduce energy consumption in some embodiments the bits Rd [63:32] are left unchanged when a 32-bit data processing operation is performed upon 32-bit operands. The energy saved not only includes the energy that would be required to change the values stored within the most significant 32-bits of the result register as the result value is typically driven out upon signal lines that have a capacitance and which consumes energy in driving those signal lines. Furthermore, there is typically a high fan out in relation to the result operand as this is often required for other portions of the processor 2, such as result forwarding logic and the like. Thus, the energy consumed in altering the most significant 32-bits of the 64-bit result register even when these are not representing valid data would be considerable. Accordingly, the option of leaving these most significant 32-bits unaltered saves a worthwhile amount of energy.

Figure 5:
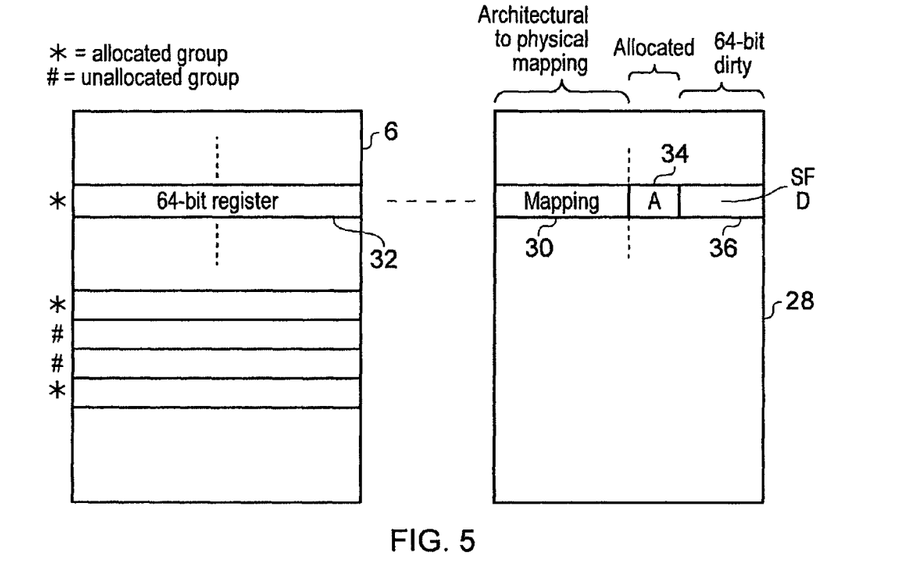
FIG. 5 schematically illustrates data for controlling register remapping operations and register flushing associated with a plurality of general purpose registers.

FIG. 5 illustrates the registers 6 which are 64-bit registers. These are associated with register control data 28, which includes mapping data 30 specifying an architectural register currently mapped to an associated individual 64-bit register 32. Also included within the register control data for the register 42 are an allocated field 34 indicating whether the register 32 is currently allocated to an architectural register and a 64-bit dirty register 36 indicating whether a 64-bit data value has been written to the register 32 at any stage during the current processor execution since the 64-bit dirty value was last reset. The allocated bit 34 serves to enable two groups of 64-bit registers to be delineated. These are an allocated group of registers which are currently allocated to architectural registers (it will be appreciated that out-of-order considerations may mean that there can be a one-to-many mapping between architectural registers and physical registers existing at any given time with a different physical register representing the values of the architectural register at different points within a stream of program instructions being executed). The unallocated registers are registers which are not currently active in representing an architectural register value and are available within a pool from which they may be selected for use in representing an architectural value and moved into the allocated group.

Figure 6:
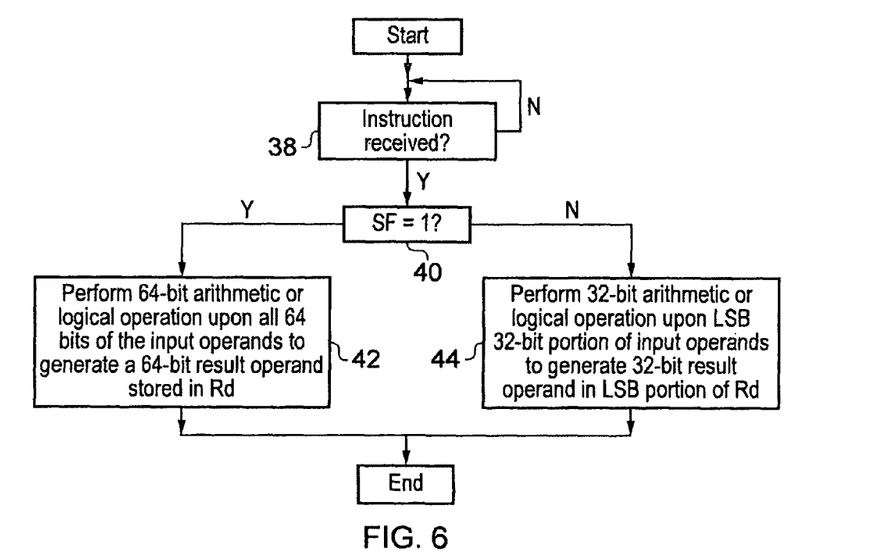
FIG. 6 is a flow diagram schematically illustrating the control performed by the operand size field.

FIG. 6 is a flow diagram schematically illustrating processing of a 64/32-bit instruction from the 64/32-bit instruction set. At step 38 processing waits until an instruction is received. Step 40 then uses the instruction decoder 14 to identify the value of the SF bit. The SF bit indicates whether the operand size and data processing is either 64-bits or 32-bits. If the SF bit has a value of "1" as determined at step 40, then processing proceeds to step 42 where a 64-bit arithmetic or logical operation is performed upon all 64-bits of the input operand values stored within the specified input registers so as to generate a 64-bit result operand which is stored within the result register. It will be appreciated that while step 42 is described in terms of arithmetic and logical operations, the SF bit may also be used to specify the operand size within other types of instruction, such as load and store instructions.

If the determination at step 40 is that the SF bit is "0", then processing proceeds to step 44. At step 44, a 32-bit arithmetic or logical operation is performed upon the least significant 32-bit portion of the input operands to generate a 32-bit result operand which is written into the least significant portion of the result register.

Figure 7:
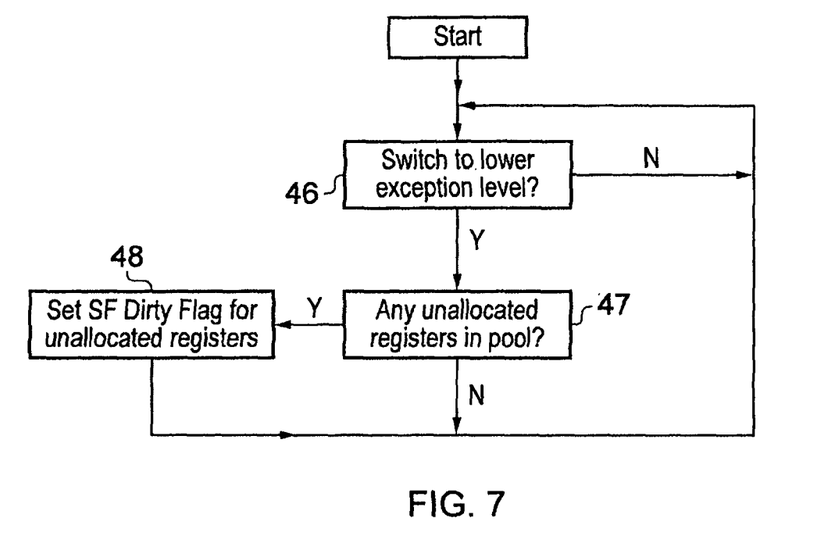
FIG. 7 is a flow diagram schematically illustrating the setting of a dirty flag associated with a register.

FIG. 7 schematically illustrates the setting of the SF dirty bit used in controlling register flushing upon a switch from a first level of privilege (first exception level) to a second, lower level of privilege (second exception level). Step 46 waits until a switch to a lower exception level is made. When such a switch is detected, then processing proceeds to step 47 where there is a test to determine if there are any unallocated registers. If there are no unallocated registers then processing returns to step 46 to await the next switch. If there are unallocated registers, then step 48 sets the SF dirty flag for all of these unallocated registers. The register renaming circuitry 24 can hold the register control data 28 illustrated in FIG. 5 including the SF dirty flags. It is also possible that this 64-bit dirty data could be stored elsewhere, such as within the register flush control circuitry 26. Another option would be to not provide the SF dirty flags and instead set all unallocated registers to a predetermined value (e.g. all zeros) whenever a switch to a lower exception level is made.

Figure 8:
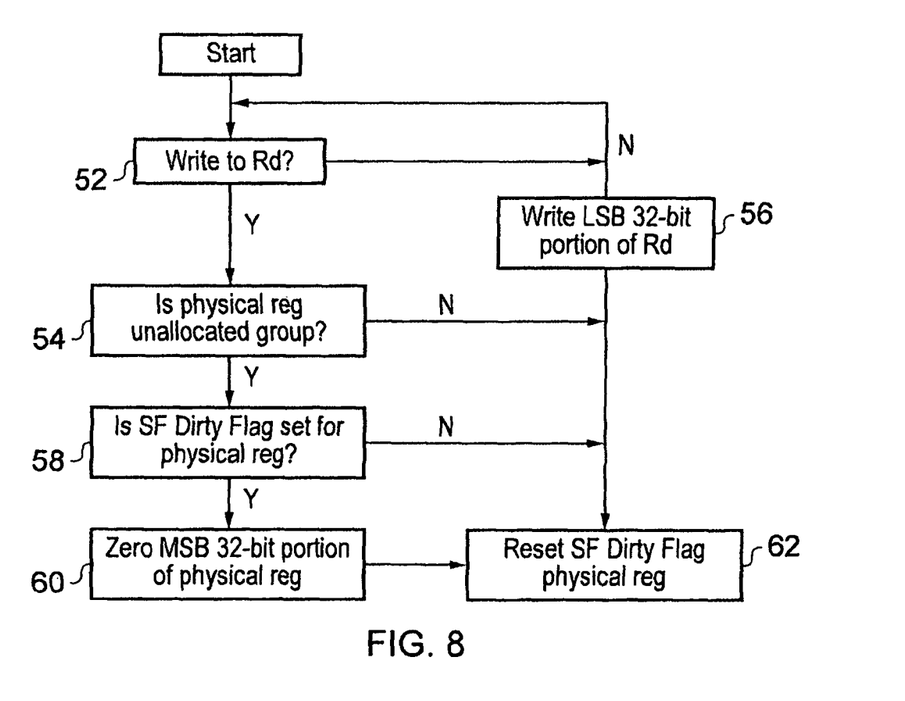
FIG. 8 is a flow diagram schematically illustrating the flushing of a register in dependence upon whether it is unallocated from a previous register mapping and has a set dirty flag.

FIG. 8 schematically illustrates the flushing of at least a portion of registers marked as 64-bit dirty. Step 52 identifies when a write is being performed to result register Rd. When a write is being performed, then step 54 determines whether or not the physical register to which the write is being made is unallocated as indicated by the allocated field 34. If the register is not unallocated, then processing proceeds to step 56 where the write is performed into the least significant 32-bit portion of the result register Rd. However, if the physical register being written to is unallocated (at least prior to the write that is currently to be performed), then processing proceeds to step 58 where a determination is made as to whether the 64-bit dirty flag 36 is set for that physical register. If the 64-bit dirty flag is not set, then the most significant 32-bits of the physical register are not at risk of storing residual data passed over from execution of the 64/32-bit instruction set and which would become potentially available should the physical register be mapped back into use without other consideration. Thus, if the 64-bit dirty flag is not set, then processing can again proceed to step 56 as there is no risk of data leakage (such as secure data leakage) due to the switch to a lower exception level. However, if the 64-bit dirty flag is set, then processing proceeds to step 60 where the most significant 32-bit portion of the physical register to be written is all zeroed, thereby removing any potential data leakage. This zeroing can be performed by the register flush control circuitry 26 and is a process that is performed under hardware control and therefore less susceptible to interference by the software. Subsequent to the zeroing of the most significant 32-bit portion of the physical register at step 60, step 62 serves to reset the 64-bit dirty flag 36 for that physical register as any residual data therein has already been zeroed. In order to reduce energy consumption there is no reason to zero the most significant 32-bit portion of the physical register more than once. Following step 62, processing proceeds to step 56 where the desired write to the register can take place.

Figure 9:
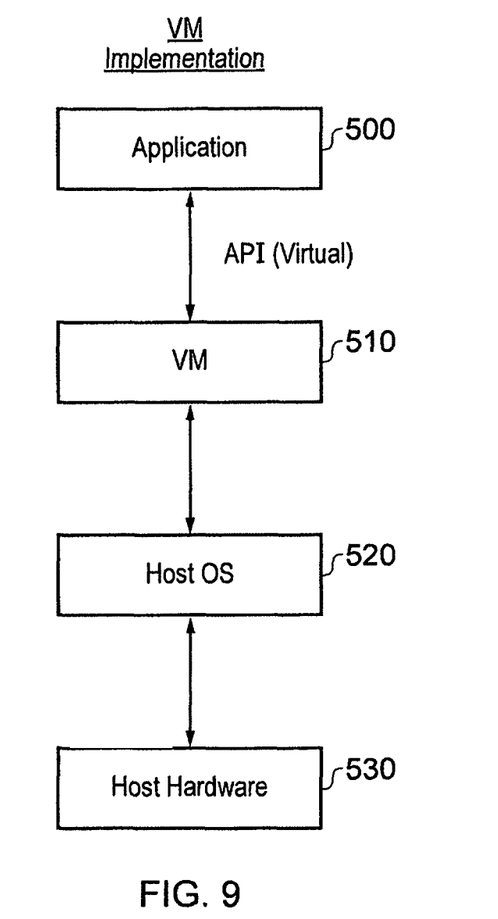
FIG. 9 illustrates a virtual machine environment embodiment.

FIG. 9 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for processing data comprising:
   a plurality of 2N-bit registers, each register configured to store only a single operand;
   processing circuitry configured to perform data processing operations; and
   instruction decoder circuitry, coupled to said processing circuitry and responsive to a stream of program instructions of only a fixed size of an instruction set, configured to generate control signals for controlling said processing circuitry to perform said data processing operations; wherein
   said instruction decoder circuitry is configured to decode arithmetic instructions and logical instructions of said instruction set respectively specifying arithmetic operations and logical operations to be performed upon operands stored within said plurality of 2N-bit registers; and
   said instruction decoder circuitry is configured to decode an operand size field within said arithmetic instructions and said logical instructions specifying only one of:
   (i) said operands are 2N-bit operands each stored within a separate 2N-bit register of said plurality of 2N-bit registers; and
   (ii) said operands are N-bit operands each stored within a separate 2N-bit register of said plurality of 2N-bit registers.

2. The apparatus as claimed in claim 1, wherein all of said arithmetic instructions and all of said logical instructions within said instruction set include said operand size field.

3. The apparatus as claimed in claim 1, wherein said operand size field specifies if an arithmetic operation or a logical operation to be performed is an 2N-bit processing operation to be performed upon 2N-bit operands or an N-bit processing operation to be performed upon N-bit operands.

4. The apparatus as claimed in claim 3, comprising register renaming circuitry configured to provide a mapping between architectural registers specified within said program instructions and 2N-bit registers of said plurality of 2N-bit registers such that during operation said plurality of 2N-bit registers include one or more allocated registers currently mapped to said architectural registers and one or more unallocated registers not currently mapped to said architectural registers.

5. The apparatus as claimed in claim 4, wherein said apparatus has a plurality of exception levels arranged in an exception level hierarchy.

6. The apparatus as claimed in claim 5, wherein when a switch is made from a first exception level of said plurality of exception levels to a second exception level of said plurality of exception levels, with said second exception level being lower in said exception level hierarchy than said first exception level, said one or more unallocated registers are flushed so as to store predetermined values.

7. The apparatus as claimed in claim 5, wherein when a switch is made from a first exception level of said plurality of exceptions to a second exception level of said plurality of exceptions, with said second exception level being lower in said level hierarchy than said first exception level, a dirty flag corresponding to each of said one or more unallocated registers is set.

8. The apparatus as claimed in claim 7, wherein changing said 2N-bit register from being one of said one or more unallocated registers to being one of said one or more allocated registers, triggers bit positions within said 2N-bit register not overwritten with said N-bit value to be set to predetermined values.

9. The apparatus as claimed in claim 7, wherein when a switch is made from a first exception level of said plurality of exception levels to a second exception level of said plurality of exception levels, with said second exception level being lower in said exception level hierarchy than said first exception level, said 2N-bit register having a set dirty flag is flushed so as to store a predetermined value.

10. The apparatus as claimed in claim 3, wherein when said operand size field specifies an N-bit processing operation, a most significant N-bits within an 2N-bit register storing an N-bit result operand are one of:
    (i) all set to zero; and
    (ii) all set to a value sign extending said N-bit result operand.

11. The apparatus as claimed in claim 3, wherein when said operand size field specifies an N-bit processing operation, a most significant N-bits within an 2N-bit register storing an N-bit result operand are not changed during said N-bit processing operation.

12. An apparatus for processing data comprising:
    a plurality of 2N-bit register means for storing data values, each of said register means configured to store only a single operand;
    processing means for performing data processing operations; and
    instruction decoding means, coupled to said processing means, for generating control signals for controlling said processing means to perform said data processing operations in response to a stream of program instructions of only a fixed size of an instruction set; wherein
    said instruction decoding means is configured to decode arithmetic instructions and logical instructions of said instruction set respectively specifying arithmetic operations and logical operations to be performed upon operands stored within said plurality of 2N-bit register means; and
    said instruction decoding means is configured to decode an operand size field within said arithmetic instructions and said logical instructions specifying only one of:

(i) said operands are 2N-bit operands each stored within a separate 2N-bit register means of said plurality of 2N-bit register means; and (ii) said operands are N-bit operands each stored within a separate 2N-bit register means of said plurality of 2N-bit register means.

13. A method of processing data comprising the steps of:

storing data values within a plurality of 2N-bit registers, each register configured to store only a single operand;

performing data processing operations using processing circuitry; and decoding a stream of program instructions of only a fixed size of an instruction set to generate control signals for controlling said processing circuitry to perform said data processing operations; wherein said decoding step decodes arithmetic instructions and logical instructions of said instruction set respectively specifying arithmetic operations and logical operations to be performed upon operands stored within said plurality of 2N-bit registers; and said decoding decodes an operand size field within said arithmetic instructions and said logical instructions specifying only one of:

(i) said operands are 2N-bit operands each stored within a separate 2N-bit register of said plurality of 2N-bit registers; and (ii) said operands are N-bit operands each stored within a separate 2N-bit register of said plurality of 2N-bit registers.

14. The method as claimed in claim 13, wherein all of said arithmetic instructions and all of said logical instructions within said instruction set include said operand size field.

15. The method as claimed in claim 13, wherein said operand size field specifies if an arithmetic operation or a logical operation to be performed is an 2N-bit processing operation to be performed upon 2N-bit operands or an N-bit processing operation to be performed upon N-bit operands.

16. The method as claimed in claim 15, comprising mapping between architectural registers specified within said program instructions and 2N-bit registers of said plurality of 2N-bit registers such that during operation said plurality of 2N-bit registers include one or more allocated registers currently mapped to said architectural registers and one or more unallocated registers not currently mapped to said architectural registers.

17. The method as claimed in claim 16, wherein said method of processing data has a plurality of exception levels arranged in an exception level hierarchy.

18. The method as claimed in claim 17, wherein when a switch is made from a first exception level of said plurality of exception levels to a second exception level of said plurality of exception levels, with said second exception level being lower in said exception level hierarchy than said first exception level, said one or more unallocated registers are flushed so as to store predetermined values.

19. The method as claimed in claim 17, wherein when a switch is made from a first exception level of said plurality of exceptions to a second exception level of said plurality of exceptions, with said second exception level being lower in said level hierarchy than said first exception level, a dirty flag corresponding to each of said one or more unallocated registers is set.

20. The method as claimed in claim 19, wherein changing said 2N-bit register from being one of said one or more unallocated registers to being one of said one or more allocated registers, triggers bit positions within said 2N-bit register not overwritten with said N-bit value to be set to predetermined values.

21. The method as claimed in claim 19, wherein when a switch is made from a first exception level of said plurality of exception levels to a second exception level of said plurality of exception levels, with said second exception level being lower in said exception level hierarchy than said first exception level, said 2N-bit register having a set dirty flag is flushed so as to store a predetermined value.

22. The method as claimed in claim 15, wherein when said operand size field specifies an N-bit processing operation, a most significant N-bits within an 2N-bit register storing an N-bit result operand are one of:

(i) all set to zero; and (ii) all set to a value sign extending said N-bit result operand.

23. The method as claimed in claim 15, wherein when said operand size field specifies an N-bit processing operation, a most significant N-bits within an 2N-bit register storing an N-bit result operand are not changed during said N-bit processing operation.

* * * * *